United States Patent
Asper

[15] 3,679,052
[45] July 25, 1972

[54] FILTRATION APPARATUS AND METHOD

[72] Inventor: Jean-Jacques Asper, Geneva, Switzerland
[73] Assignee: Brasco S.A., Geneva, Switzerland
[22] Filed: March 27, 1970
[21] Appl. No.: 25,169

[30] Foreign Application Priority Data

March 27, 1969 Switzerland ..........................4692/69

[52] U.S. Cl. .................................210/75, 210/82, 210/193, 210/195, 210/295, 210/411
[51] Int. Cl. ....................................B01d 33/36, B01d 37/02
[58] Field of Search..............210/75, 193, 67, 82, 195, 295, 210/411

[56] References Cited

UNITED STATES PATENTS

| | | | |
|---|---|---|---|
| 2,055,869 | 9/1936 | Manning | 210/193 X |
| 2,952,363 | 9/1960 | Griswold | 210/193 |
| 3,392,835 | 7/1968 | Asper | 210/193 X |
| 2,152,167 | 3/1939 | Ahlmann | 210/193 X |
| 1,992,101 | 2/1935 | Stuart | 210/193 X |
| 2,205,331 | 6/1940 | Alton | 210/75 |
| 2,738,880 | 3/1956 | Whitney | 210/193 |
| 3,362,533 | 1/1968 | Muller | 210/75 |
| 3,520,805 | 7/1970 | Ryan | 210/75 X |

Primary Examiner—John Adee
Attorney—Brumbaugh, Graves, Donohue & Raymond

[57] ABSTRACT

A pressure filter and a method of filtering of the type employing a particulate filter aid may be operated substantially continuously through an operating cycle composed of a cleaning stage of short duration, say on the order of 4 or 5 seconds, in which the filter aid layer and accumulated filter cake are purged from an open-work, supporting filter element, a coating stage in which a new layer of filter aid is formed on the filter element and involving a time of about 10 seconds, and a filtering stage. A rapid coating of the element with a layer of filter aid is facilitated by using a filter aid having a mean particle size approximately equal to the size of the openings in the support. The filter aid purged from the filter chamber during each cleaning cycle is recovered by conducting the mixture of filter aid, impurities, and raw liquid from the filter, upon cleaning, to a holding tank and then recycling, over a period of time or continuously, the mixture from the holding tank through a separator. The filter aid fraction is separated and conducted into a filter aid storage tank for use during the next cycle, make-up filter aid and filtrate being added to the filter aid storage tank as required. The level in the holding tank is reduced just before each cleaning to the extent required to provide a capacity sufficient to receive the mixture purged from the filter during cleaning. Continuous filtrate output may be achieved by accumulating filtrate in a storage reservoir during the filtering stage (for delivery) during the cleaning and filter aid coating stages.

21 Claims, 2 Drawing Figures

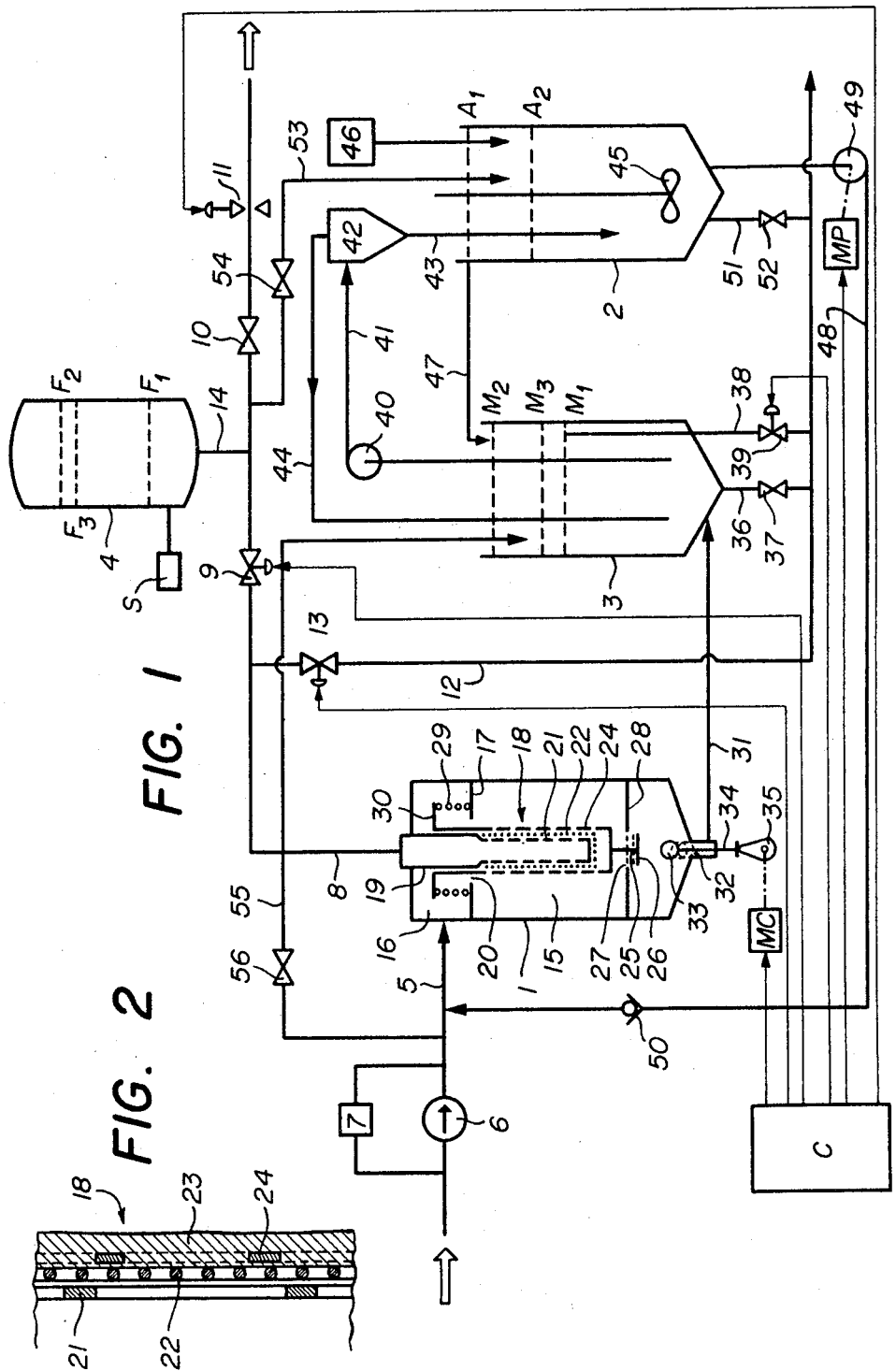

FILTRATION APPARATUS AND METHOD

BACKGROUND OF THE INVENTION

This invention relates to filter apparatus of the type for filtering a fluid under pressure and employing filter aid as the filtering medium, and to a method of filtering that operates on an essentially continuous basis and, preferably, involves repeated use of a filter aid charge.

The use of filtering layers composed of particles of a filtering material, generally known as a filter aid, has been known for quite some time, especially for water filtration. In most cases, these layers are deposited on an open-work support by means of a current of fluid containing filter aid particles and circulating between the inlet and outlet of the filtering chamber.

The openings of the support upon which the filter aid layer is formed are generally several times larger than the filter aid particles, and the layer is deposited by circulating a fluid with the particles entrained in it several times through the support in a closed circuit. The formation of the filter aid layer therefore requires taking the filter out of service for several minutes. In many cases, only a relatively thin layer is formed in this manner, the thickness of this layer being subsequently increased by continuous addition, during filtration, of filter aid particles to the fluid to be filtered. The porosity of the filter cake is thus increased in order to avoid rapid clogging up of the filtering layer by the impurities retained thereby. The increase in thickness of the filtering layer and of the filter cake of impurities, however, produces an appreciable increase in the pressure loss across the filter during filtration, which in turn limits the filtering capacity.

When the layer of filter aid and impurities has been built up to the extent that effective filtering is no longer feasible, renewal of the filter necessitates, first, removal of the old layer of filter aid and cake from the support and its discharge from the filtration chamber through an outlet provided for this purpose and, second, the building of a new layer of filter aid on the support. This entails two successive operations during which filtration is interrupted and the duration of which should obviously be reduced as far as possible. The first operation, which is basically a cleaning operation, poses substantially the same problems inherent to conventional filters. Many of the numerous solutions proposed heretofore for cleaning filters, as by fluid back-flow or by mechanical scraping of the filtering elements, for example, involve, however, the use of highly complicated equipment and techniques which involve a considerable cleaning time. The use of several filter cells operating in parallel for ensuring continuous filtration does not, however, in any way prevent the loss in capacity due to interruption of filtration when cleaning each cell. Moreover, many of the previously known filter cleaning systems require a separate system for each cell for effecting more or less rapid cleaning and are therefore generally so complicated that their use in large, multicellular filters is economically and technologically prohibitive in most cases.

The second operation, i.e. formation of the filtering layer, obviously entails considerable additional problems, since the equipment and methods proposed heretofore for this purpose are also very complicated and require taking each cell out of operation for a relatively long period of time. It is thus obvious that continuous filtration, in a system using a filter aid, tends to be even more difficult to achieve since it requires, in addition to the means and the time necessary for cleaning, further means and time necessary for forming the filtering layer.

The feasibility of using a filter aid likewise depends on economic considerations, inasmuch as the price of the filter aid may easily become prohibitive, especially when it is only used once for filtering. For that reason, it has been proposed to recover the filter aid for reuse. However, the devices and techniques hitherto proposed for this purpose are most complicated and are hardly suitable where substantially continuous filtration is required.

SUMMARY OF THE INVENTION

There is provided, in accordance with the invention, a filter apparatus and a filtering method which overcome the limitations and disadvantages of known apparatus and methods, such as those referred to above, and provide numerous advantages including essentially continuous operation, that is, no interruption in filtrate output, effective and high capacity filtering, efficient operation, especially by reason of reusing filter aid and a relatively low capital investment in the equipment.

In accordance with the invention, fluid is filtered in a pressure filter having a filter chamber that is provided with an inlet for the raw liquid to be filtered, an outlet for the filtrate, an open-work partition between the inlet and outlet for supporting a layer of filter aid and dividing the chamber into an inlet section and an outlet section that communicate with each other only through the partition, and a cleaning outlet serving the inlet section and having a cyclically controlled, rapid acting valve for selectively releasing raw liquid, filter aid and accumulated filter cake from the inlet section in a two-stage cleaning sequence. The raw liquid is supplied continuously to the inlet of the filter chamber, and each cycle of operation comprises coating stage, in which a layer of filter aid is formed on the partition, by introducing filter aid into the inlet with the raw liquid, a normal filtering stage, in which the raw liquid is forced under pressure through the filter aid layer and the partition and out from the filtrate outlet, and a cleaning stage, in which the filter aid layer, the accumulated filter cake and a quantity of liquid are purged from the inlet section through the cleaning outlet.

The mixture purged from the inlet section of the chamber upon cleaning is conducted to a holding tank and, over a period of time, which usually will involve a substantial part of a normal filtering stage, or may even run continuously, the mixture is circulated through a separator, preferably a dynamic separator such as a cyclone, which separates out a fraction composed predominately of filter aid. This fraction is conducted into a filter aid storage tank, and the remaining fraction is circulated back to the holding tank, so that over a period of time, most of the filter aid in the holding tank is recovered for reuse. Make-up filter aid may be added to the storage tank, together with make-up liquid which may be drawn from the filtrate outlet. When the next cycle of operation begins, the filter aid in the storage tank is delivered to the filter chamber to recoat the partition.

Unlike previous filtering methods employing a filter aid in which openings in the open-work support on which the filter aid layer is formed are several times as large as the average or mean size of the filter aid particles, the method, in accordance with the invention, employs a support having openings that are of substantially the same size as the mean size of the particles. It has been found, quite unexpectedly, that the use of filter aid support, having this size relationship to the size of the filter aid, does not impair the effectiveness of filtering or appreciably reduce the rate of filtering, and it offers the distinct advantage of enabling the open-work support or partition to be coated in a very short time, say on the order of 10 seconds or less. Moreover, only a negligible amount of filter aid passes through the partition, so even though it is usually desirable for the outflow from the chamber, during a coating operation, to be discharged to waste or to some other point separate from the point to which the filtrate is discharged, the amount of liquid lost from the system during filter aid coating is maintained at a minimum. Because the duration of the coating operation is relatively short, it also becomes feasible to store filtrate in a storage receptacle during normal filtering and then release the stored filtrate to the output of the equipment during the cleaning and coating stages of each cycle so as to provide uninterrupted output of the equipment.

The ability to reuse the filter aid for many operating cycles significantly reduces the cost of operation of the filter, and in many instances makes the difference between a practical filter aid filtering system and one that is prohibitively expensive.

The advantages derived from the short duration of the cleaning and filter aid coating stages, which usually take only about 15 seconds or even less, are manifest.

Certain features of the filter cell component of the apparatus and the manner in which it operates are described and shown in Asper U. S. Pat. No. 3,392,835, issued July 16, 1968, and Asper U. S. Pat. No. 3,345,164, issued July 8, 1969, both assigned to the assignor of the present invention. Reference may be made to those patents for additional information useful in carrying out this invention.

DESCRIPTION OF THE DRAWINGS

For a better understanding of the invention, reference may be made to the following description of exemplary embodiments of the method and apparatus taken in conjunction with the figures of the accompanying drawings, in which:

FIG. 1 is a diagrammatic view in generally schematic form showing the embodiment of the apparatus and depicting the embodiment of the method; and FIG 2 is a fragmentary, detailed cross-sectional view of the filter component of the apparatus.

DESCRIPTION OF EXEMPLARY EMBODIMENTS

Referring to FIG 1, the apparatus comprises a filter cell 1, a filter aid storage tank 2, a holding tank 3 and a filtrate storage reservoir 4 equipped with a safety valve S.

An inlet conduit 5, equipped with a circulating pump 6 and a by-pass valve 7, deliver to the cell the raw liquid to be filtered coming from a source which is not shown. The filtrate leaves the cell 1 through an outlet conduit 8 equipped with outlet valves 9 and 10 and an adjustable throttling valve 11. A waste discharge conduit 12 equipped with a valve 13 is connected to the outlet conduit 8, between the cell 1 and the valve 9. The filtrate reservoir 4 is connected to the outlet conduit 8, between the valves 9 and 10, by means of a branch conduit 14.

The cell 1 comprises a filter chamber 15 and an upper admission chamber 16 which is supplied with raw liquid to be filtered under pressure from the conduit 5, these two chambers being separated by a dividing wall 17. The cell embodies a number of features of the aforementioned Asper patents, and reference may be made to them for detailed descriptions and drawings. A brief description, however, follows.

The cell 1 comprises, in the present case, a single, cylindrical filter element 18 closed at its bottom end and arranged vertically in the chamber 15, but it will be clear to those skilled in the art that each cell may have several filter elements and that the apparatus may also employ several cells. Moreover, the method and apparatus of the invention may employ other specific types of pressure filters. The filter element 18 is fixed at its upper end to a tubular supporting member 19 passing up through the admission chamber 16 and communicating at its upper end with the outlet conduit 8. The dividing wall 17 comprises a circular, axial opening through which the tubular member 19 passes, this opening being slightly larger than member 19 so as to leave, around the member 19, a calibrated, annular throttling orifice 20 forming the passage of the raw liquid to be filtered into the filter chamber 15. The filter element 18 includes a rigid, grid-like member 21 fixed to the tubular member 19 and a permeable sleeve 22 of a suitable type, such as woven fabric, surrounding the member 21. The sleeve 22, supported by the member 21, thus forms an open-work partition that divides the chamber into an inlet section and an outlet section that are communicated with, respectively, the inlet 5 and the outlet 8 of the filter and that communicate with each other only through the partition. The sleeve 22, which is surrounded by a cylindrical scraper 24, the function of which is explained below, serves as a support for the layer 23 of filter aid (see FIG. 2), which forms the filtering surface of the filter element 18.

The mesh size of the sleeve is substantially equal to the mean filter aid particle size. This allows the filtering layer 23 to be formed rapidly, as is described below, by injecting the filter aid particles into the liquid to be filtered, because practically all the particles are then retained by the sleeve 22. In particular, the filter aid layer may be formed on the sleeve with a single cycle circulation of filter aid through the filter element, as compared to a circulation of several cycles used heretofore, thus considerably reducing the time required to form the filter aid layer.

The scraper 24 is a rigid tubular grid-like sleeve, preferably of plastic material, the openings of which are several times larger than the meshes of the sleeve 22 (see FIG. 2). The scraper is constructed and mounted for sliding movement along the outer surface of the sleeve 22. A rod 25 connects the bottom end of the scraper 24 to a transverse plate 26 that actuates the scraper 24 in a manner described blow. A spring 29 positioned between the dividing wall 17 and a flange 30 fixed to the upper end of the scraper 24 tends to maintain the scraper in its position at rest, which is in dotted lines in FIG. 1. In the rest position, the plate 26 occupies an opening 27 formed in a transverse dividing wall 28 located between the filter element 18 and the bottom of filter chamber 15.

The filter chamber 15 is connected by a conduit 31 to the holding tank 3 through a cleaning outlet 32 in the bottom of this chamber. The outlet 32 is equipped with a ball valve 33 that is actuated, through a push-rod 34, by a cam driven by a motor MC and having a profile comprising three parts, the first part of which provides rapid complete opening of the valve (the position shown in FIG. 1), the second part provides a rapid partial closure, and the third part provides complete closure of the valve. The valve 33 controls the cleaning of the filter element 18 of the cell after each filtration phase and allows the mixture of fluid, impurities and filter aid particles to be discharged to the holding tank 3. A conduit 36 equipped with a normally closed valve 37 connects the lower end of tank 3 to the waste conduit 12 so as to allow the tank to be emptied completely, if desired or necessary. Furthermore, a conduit 38 extending through the tank up to a predetermined height represented by the dashed line $M_1$ serves to empty, upon opening a valve 39 shortly before each cleaning cycle, an amount of mixture of impurities and liquid from the holding tank 3 to the conduit 12 roughly equal to the amount that will be received from the filter reservoir upon cleaning.

A pump 40 in a conduit 41 serves to cycle continuously in closed circuit the mixture of fluid, impurities and filter aid particles contained in the holding tank 3 to a suitable type of dynamic separator 42, such as a cyclone type, for example. The separator 42 separates the mixture it receives into two fractions. One fraction, which is predominately filter aid, is conducted into the filter aid tank 2 by a conduit 43, while the other fraction, which contains the major part of the impurities and liquid, is returned to the holding tank 3 through a conduit 44.

The filter aid tank 2 is equipped with a mixer 45 for continuously stirring the mass of liquid and filter aid particles contained therein to retain the filter aid in suspension. A feed device 46 introduces new filter aid in measured amounts into tank 2, both when the apparatus is first started into operation when a complete charge of new filter aid is introduced and, thereafter, each time the addition of make-up filter aid is desired. An overflow pipe 47 leading to the auxiliary tank 3 is mounted on tank 2 at the upper level $A_1$. Filter aid from the tank 2 is injected, after each cleaning cycle, through a conduit 48 equipped with a pump 49 and a one-way valve 50, into the raw liquid entering the cell 1. A conduit 51 equipped with a shut-off valve 52 connects the bottom end of tank 2 to discharge conduit 12 so as to allow emptying this tank completely. Furthermore, a conduit 53 equipped with a valve 54 is branched off the outlet conduit 8 so as to allow supplying the tank 2 with filtered liquid. A conduit 55 equipped with a valve 56 is likewise branched off the inlet conduit 5 so as to allow feeding tank 3 with unfiltered liquid.

OPERATION

An automatic control device C which may be of any suitable type known to those skilled in the art and which is, therefore, not described in detail here, controls the operating cycle of the apparatus. This cycle comprises the following three basic operations:
a. Formation of the filter aid layer,
b. Normal filtration,
c. Two-phase cleaning.

The raw liquid supply pump 6 is in continuous operation and delivers unfiltered fluid to the cell 1 during these three operations, and the valve 10 also remains open at all times to allow continuous output of filtrate.

a. FORMATION OF FILTER AID LAYER

To form the filter aid layer on the filter sleeve 22, a measured quantity of filter aid is taken from the tank 2 and injected into the incoming unfiltered liquid arriving at the cell 1. To this end, the control device C opens the valve 13 in the waste conduit 12, closes the valve 9 in the filtrate outlet conduit 8, brings the valve 11 in the filtrate outlet conduit to a reduced-opening position, and places the injection pump 49 in operation. At this point, the valve 33 is fully closed, a cleaning stage of the cycle having just been completed. Unfiltered liquid carrying filter aid particles is thus introduced into the admission chamber 16, passes through the inlet orifice 20 of the filter chamber 15, flows rapidly along the sleeve 22 and leaves essentially all the filter aid particles thereon before passing through the sleeve and thereafter leaving the cell through the discharge conduit 12 by way of valve 13, which is then open, as mentioned above. A uniform layer 23 of filter aid particles is thus rapidly formed on the sleeve 22, and the unfiltered liquid having served to form it is discharged to waste through the conduit 12. The time required to form the filter aid layer will depend on the desire thickness (which does not, in practice, vary appreciably) and will usually be about 10 seconds. During the time that the filter aid layer is being reformed after each cleaning of the filter, filtrate continues to be supplied from the reservoir 4, but usually at a reduced rate, since the valve 11 is partially closed.

The amount of filter aid injected into cell 1 for forming a filtering layer having a desired thickness may be ascertained and controlled from the drop in the level of filter aid and liquid in the tank; i.e., the quantity of filter aid required to obtain a desired coating is determinable and is evident in a drop from, with reference to FIG. 1, a level $A_1$ to a level $A_2$ in tank 2. Once the desired layer is formed, injection pump 49 is stopped by the control device C, for example, by a liquid level detector and control device associated with the control device C.

b. FILTRATION

For filtration, the control device C opens valve 9 and closes valve 13, while valve 33 remains closed. At the beginning of filtration, throttling valve 11 remains in its reduced opening position to allow the reservoir 4 to be refilled while filtrate is delivered at the same time. When the reservoir 4 has been filled up to the upper level $F_2$, valve 11 is adjusted, by the control device C, to a higher flow rate corresponding to the desired filtrate output rate of cell 1.

c. CLEANING

When the impurities trapped by the filter aid layer cause a substantial reduction in the effectiveness of the filter, cleaning is undertaken to remove the filter aid layer and impurities or so-called "filter cake" from the cell in order to allow replacement thereof by a fresh filter aid layer. The cleaning is composed of a first phase by which a sudden backflow of filtrate throws off the charged layer from sleeve 22, the backflow being created by a sudden reversal of the pressure gradient through the filter sleeve. In a second phase the mixture of filter aid particles and impurities is purged from the cell by means of a flow of unfiltered liquid. Before sea cleaning operation, valve 39 is opened for a short period to drain the auxiliary tank 3 down to the lower level $M_1$. The cleaning cycle is controlled by the control device C which operates the valve 33 through the cam 35 in the following manner:

The control device C starts the motor MC, which drives the cam 35. At the beginning of the first phase, valve 33 is suddenly opened completely by the cam 35 (position shown in FIG. 1), the flow passage thereof being sufficiently large to produce a sudden and substantial pressure drop in the filter chamber 15 such as to establish a sudden reversal of pressure gradient across the filter element 18. The resulting abrupt backflow of filtered liquid from the filtrate reservoir 4 and passing outward through the filter element 18 causes the filter aid layer to be broken away and thrown off the sleeve 22. The duration of this first phase is just sufficient for sudden, complete opening of the valve 33 and, immediately thereafter, partial closure of the valve 33, such duration being about one second, so that the loss of filtered liquid by backflow in the first phase is very small. When the valve 33 opens, the plate 26, which before occupied a rest position (shown in dotted lines in FIG. 1), is subjected to a force due to the sudden pressure drop on the downstream side of the partition 28 and to the sudden flow of liquid towards the open outlet 32, so that the plate is displaced downwards suddenly and comes to the lowermost position shown in FIG. 1. This displacement causes a corresponding downward sliding movement of the scraping ember 24 along sleeve 22 for removal of substantially all particles adhering to the outer surface thereof.

The first part of the cleaning phase is terminated when the valve 33 is brought to its intermediate, partially open position indicated by dotted lines in FIG. 1, the level in reservoir 4 then having fallen to $F_3$. In this intermediate position the flow cross-section of the valve is chosen such that the pressure becomes substantially equal on both sides of the filter sleeve element 13. Consequently, in the second phase, the scraper 24 carries out a partial, upward sliding movement under the action of its return spring 29 and brings the plate 26 into an intermediate position between its position of rest and that corresponding to the complete opening of the valve 33. Unfiltered liquid then circulates through the chamber 15 and purges the filter aid particles and impurities from the chamber through the outlet device 32 and the conduit 31, liquid flow through the sleeve 22 then being substantially interrupted due to the balancing of pressures on both sides thereof. This second phase is of a duration several times longer than the first, e.g., about 4 seconds, and is terminated by complete closure of the valve 33 as the cam 35 returns to its starting position. The scraper 24 then returns to its position of rest, under the action of the spring 29, and the plate 26 returns into the opening 27. During this second phase, the level in reservoir 4 falls partway from $F_3$ to $F_1$, the corresponding amount of filtered liquid being delivered as output during this second phase, which does not entail any loss of filtered liquid by backflow through the sleeve 22. At the end of the second phase, the valve is returned to the original closed position and the control device C then shuts off the motor MC.

In the apparatus and its mode of operation described above, a single, cyclically-controlled discharge valve thus allows the filter aid layer laden with impurities very rapidly to be removed from the filter element and discharged from the cell without any notable loss of filtered liquid. Moreover, a new layer of filter aid particles may be formed in a minimum of time and hence with a minimum loss of filtering capacity, thanks to the use of an open-work support for the layer, which has openings of about equal size to the mean filter aid particle size, whereby passage of practically all the injected particles is prevented. The rapid renewal of the filter aid layer in the manner described above does not, however, require any material interruption of the intake of unfiltered liquid, while the reservoir allows continuous delivery of filtrate during this rapid renewal of the filter aid layer. The apparatus thus allows filtrate to be supplied continuously with a maximum output, even when only a single filter cell is used.

RECOVERY OF FILTER AID

The mixture of liquid, filter aid particles and impurities coming from chamber 15 during the two cleaning phases causes the level in the holding tank 3 to rise from M to $M_2$. The mixture contained in the tank 3 is continuously delivered by the pump 40 into the separator 42, which extracts therefrom a small fraction composed essentially of filter aid and delivers it to tank 2 while the remainder is brought back to tank 3 where it is again recycled to the separator 42 so as to extract all of the filter aid by a continuous recycling and to accumulate it in the tank 2. Once the tank 2 is filled up to the upper level $A_t$, the apparatus is ready for forming a new layer in cell 1, in the manner described above. After the filter aid has been recovered, the level in the tank 3 reaches $M_3$ and a quantity equal to the volume between levels $M_1$ and $M_3$, which is predominately impurities, is removed through the conduit 38 to the waste conduit 12, by opening the valve 39, in order to allow the tank 3 to receive the amount of mixture purged from the filter chamber during the next cleaning operation.

MULTIPLE-CELL APPARATUS

While the embodiment described above comprises a single cell having one filter element, it could obviously likewise include several cells, each comprising any number of filter elements and each operating in substantially the same manner as described above. In that case, certain components, such as the tanks 2 and 3, pump 40, separator 42, feed pump 6, reservoir 4 and throttling valve 11, would preferably be used in common for all the cells. However, in order to allow the different cleaning operations of the cells to be effected selectively, individually or in groups, it is necessary that the apparatus be arranged to allow the cells to be fed separately with filter aid. The unfiltered fluid serving to form the layer must then also be discharged selectively. However, in numerous applications where the requirements with regard to filtrate purity are not particularly strict, the slight amounts of unfiltered fluid serving to form the filter aid layer may be allowed to pass directly into the outlet conduit of the apparatus. Depending on the requirements, this manner of operation may also be used for a single-cell filter.

The construction of the cell described above has been given by way of example only. Thus, one may contemplate using cells without an admission chamber, and the throttling orifice may be arranged at any suitable point on the path of the unfiltered fluid entering the cell. The filter elements may, moreover, be of various other constructions and may not be equipped with scrapers. The scrapers may be actuated in other ways, for example by a rigid connection to the discharge valve.

Thus, there is provided, in accordance with the present invention, an apparatus and a method providing filtration of any fluid by means of a filter aid with efficient and economical use of the filter aid, thanks to rapid formation of the filter aid layer, rapid two-phase cleaning of very short duration and effective recovery of the adjuvant. It allows cleaning to be carried out at much shorter intervals than in other known filters, without incurring a notable loss in filtering capacity. By avoiding continuous injection of filter aid particles during the filtration phase, filtration may be effected with substantially thinner filtering layers and consequently with a considerably reduced pressure loss. In addition, the filter aid may be recovered for reuse a large number of times, thus providing a considerable saving.

As to the choice of filter aid, it will, of course, be made in the light of the nature of the fluid to be filtered, the impurities contained therein, and the price of the filter aid. Various materials may be used as filter aid. Thus, for example, the filter aid particles may be of diatomaceous earth, quartz, glass, clay (attapulgite or attaclay), alumina, various plastics, such as polyvinyl chloride or polystyrene, or of composite materials composed, for example, of plastic material and metallic powder. Rather than recovering filter aid by dynamic separation, one may, depending on the nature of the filter aid and of the impurities present, recover the filter aid in various other ways, for example by decanting, washing or by chemical or magnetic separation.

EXAMPLE

Equipment conforming substantially to that shown in the drawings and described above has been operated extensively on a developmental basis in a variety of filtration operations. The filter element of the test unit was composed of a thin-walled, perforated tube made of plastic and a filter sleeve of synthetic fiber having openings ranging from 29 to 30. The filter had an effective open area of about 316 $cm^2$. The scraper sleeve was of synthetic fiber tissue and had openings of about 800.

Although various filter aid materials have been tested, some emphasis in developmental work has been in the area of filtering raw water in a purification system to produce potable water, and good results for this application have been obtained with a diatomaceous earth supplied by Johns-Manville International Corporation under the name "Celite." Two grades of "Celite" were used, the two differing from each other slightly in granulametric analysis, as is evident from Table 1 below.

TABLE 1

Granulmetry, Celite 535 and 545

| Diameter of particles in microns | Celite 535 percent | Celite 545 percent |
| --- | --- | --- |
| 1-2 | 0 | 0 |
| 2-6 | 2.5 | 1 |
| 6-10 | 16 | 5 |
| 10-20 | 32 | 18 |
| 20-40 | 32 | 52 |
| 40-60 | 12.5 | 16 |
| 60 | 5 | 9 |

It has been found that filtration obtained with the equipment and method of the invention is generally comparable to conventional rapid sand filters but that a higher rate of throughput is possible. At slower rates, the filtering is, of course, more effective. A wide range of filtering velocities and number of cycles have been tested, ranging from 8-9 m./hr. to 34-35 m./hr., with as many as 50 cycles before discarding the Celite. The duration of each cycle may vary widely, with varying results, but a duration of 30 min. appeared to be close to optimum under the conditions of the tests. Filtering effectiveness was somewhat impaired at filtering velocities over about 28 m./hr. and after about 48 hr. at 28 m./hr. and 30 minute cycles. Where microorganisms in the filtrate are a consideration, as with potable water, it is important that the regenerated filter aid be disinfected.

It was found that it took from about 20 seconds to 1 or 2 minutes to stabilize the filter after each cleaning and filter aid coating, a small amount of filter aid passing the support during this time. If small quantities of filter aid and slight impairment of filtrate quality can be tolerated, filtrate delivery through the normal output can be resumed after the cleaning and coating stages, i.e., after about 15 seconds from the beginning of cleaning. It appears that a filter aid layer having a thickness of from about 1.0 to 1.5 mm is appropriate.

I claim:
1. In a pressure filter for filtering liquids through a layer of particulate filter aid material having a filter chamber having an inlet for the liquid to be filtered, a filtrate outlet and an open-work partition arranged between said inlet and said out- let for supporting said layer on the inlet side of said partition, a cleaning outlet having a discharge valve arranged on the inlet side of said chamber for discharging said layer, a throttling orifice arranged at said inlet for connection of said chamber to a source of said liquid and for restricting the rate of inflow of said liquid, a filtrate reservoir communicating with said outlet and adapted to store filtrate at a given pressure, means for controlling the discharge valve to provide rapid cyclic operation thereof including a closed stage and an opened stage for producing a sudden pressure drop in the liquid on the inlet side of the chamber and causing thereby an abrupt reversal of the pressure gradient across the partition to effect removal of the layer of filter aid and impurities from the partition, and means for forming said layer of filter aid material on said partition by delivering filter aid material to the inlet side of the chamber, the following improvements: (1) said open-work partition has openings of a size substantially equal to the mean size of the particles of said filter aid material, and (2) said layer forming means injects rapidly into the said inlet an amount of filter aid material necessary for forming said layer with a given thickness and provides formation of said layer in a short period at the beginning of said fully closed stage of the discharge valve for subsequent filtering through said layer during said fully closed stage, the pressure filter providing substantially continuous filtration with only brief interruptions for rapid renewal of said layer at given intervals, removal of the layer from the partition and discharge thereof from the chamber being provided by operation of said valve during the open stage and third stages, respectively, and rapid formation of a new layer being provided by operation of said layer forming means.

2. A pressure filter according to claim 1 and further comprising a receptacle for storing the filter aid in suspension in a liquid, means for selectively supplying filter aid from the storage receptacle to the inlet of the filter chamber, a holding tank, means for conducting material from the cleaning outlet of the filter chamber to the holding tank, means for separating a mixture of filter aid liquid and the impurities extracted upon filtering, such mixture constituting the aforesaid material, into a first fraction containing predominantly filter aid and a second fraction containing predominantly impurities, means for supplying the material from the holding tank to the separating means, means for supplying the first fraction from the separating means to the filter aid storage receptacle, and means for supplying the second fraction from the separating means to the holding tank.

3. A pressure filter according to claim 1 wherein the means for controlling the discharge valve provides a partial open position in which the pressures on either side of the open-work partition are substantially balanced.

4. A pressure filter according to claim 2 wherein the separating means includes a dynamic separator.

5. A pressure filter according to claim 4 wherein the dynamic separator is a cyclone separator.

6. A pressure filter according to claim 2 and further comprising means for supplying makeup filter aid from a source thereof to the filter aid storage tank.

7. A pressure filter according to claim 2 and further comprising means for selectively supplying filtrate from the outlet of the filter chamber to the filter aid storage tank.

8. A pressure filter according to claim 2 and further comprising conduit means coupled to the filter chamber filtrate outlet for selectively discharging effluent from the outlet section of the chamber to waste.

9. A pressure filter according to claim 2 and further comprising means for conducting overflow from the filter aid storage tank to the holding tank, thereby to retain any excess of the suspension of filter aid in the tank in the system.

10. A pressure filter according to claim 2 and further comprising means for selectively drawing down the level in the holding tank to a point such that it has the capacity to receive a given quantity of the mixture from the cleaning outlet of the filter chamber.

11. A pressure filter according to claim 2 and further comprising a filtrate storage reservoir connected by a branch conduit to a conduit connected to the filtrate outlet of the filter chamber, valve means upstream, relative to the direction of flow of filtrate from the filter, from the branch conduit for selectively cutting of flow from the filter to the reservoir, and valve means downstream from the branch conduit for restricting the flow of filtrate from the reservoir.

12. A method of filtering liquids under pressure through a filter layer composed of particulate filter aid material in a pressure filter having a filter chamber enclosing an open-work partition having openings of given size and having an inlet and an outlet separated by said partition; means defining a gauged throttling passage associated with said inlet for connection thereof to a source of the liquid to be filtered under pressure while restricting the rate of inflow of said liquid to said chamber; means defining a filtrate reservoir in communication with said outlet, for receiving filtrate and maintaining it at a given pressure; a cleaning outlet in communication with the filter chamber on the inlet side thereof; a discharge valve associated with the cleaning outlet; and means for successively operating the valve to provide a rapid cyclic operation thereof including a closed stage for filtering and an opened stage for producing a sudden pressure drop in the liquid on the inlet side of the chamber to a value below said given pressure in the filtrate reservoir effective to cause an abrupt reversal of the pressure gradient across the partition and a removal of the layer of filter aid and impurities from the partition; said method comprising the steps of: (a) forming said filter layer during a brief period at the beginning of said closed stage of the discharge valve by choosing said filter aid material so that the mean particle size thereof is substantially equal to the size of the openings of said partition and by rapidly injecting into a stream of liquid flowing from said inlet to said outlet a given amount of said material corresponding to a filter layer of given thickness, such that substantially all the injected filter aid particles are carried by said stream to said partition and are retained thereby to form said layer, while the liquid stream substantially free of filter aid particles flows to said outlet; (b) thereafter filtering said liquid under pressure through said filter layer during said closed stage of the discharge valve while conducting the filtrate from said outlet partially to said reservoir; (c) after using said layer for filtering, providing sudden removal thereof from the partition during said opened stage of the discharge valve and rapid discharge of the material of the used layer through said cleaning outlet; and (d) cyclically repeating steps (a), (b) and (c) during the whole operation of said pressure filter, such as to provide substantially continuous filtrate delivery, with prolonged filtration during each step (b) and brief interruptions thereof during steps (c) and (a) for providing rapid renewal of the filter layer.

13. A method of filtering according to claim 12 and further comprising the step of supplying make-up filter aid from a source thereof to the filter aid storage tank.

14. A method of filtering according to claim 12 and further comprising the step of selectively supplying filtrate from the outlet of the filter chamber to the filter aid storage tank at some time during the normal filtering step of an operating cycle.

15. A method of filtering according to claim 12 wherein the outflow from the outlet section of the filter chamber is discharged during step (a) of an operating cycle to a place separate from the place to which the filtrate is normally discharged.

16. A method of filtering according to claim 12 wherein the overflow from the filter aid storage tank is conducted to the holding tank, thereby to retain any excess of the filter aid therein in the system.

17. A method of filtering according to claim 12 and further comprising the step of drawing down prior to step (c) in each cycle the level in the holding tank to a point such that it has the capacity to receive the quantity of the filter aid layer, liquid and impurities discharged from the cleaning outlet of the filter chamber.

18. A method of filtering according to claim 12 and further comprising the step of accumulating a quantity of filtrate in a filtrate storage reservoir at some time during step (b) of a cycle, and releasing at least a part of the accumulated filtrate from the reservoir during step (c) of each cycle.

19. A method of filtering according to claim 20 wherein a portion of the filtrate accumulated in the storage reservoir is released during step (a) of each cycle.

20. A method of filtering according to claim 19 wherein the rate of filtrate flow from the reservoir during step (a) is controlled to a value less than the rate of filtrate flow during step (b).

21. A method according to claim 12 and further comprising the steps of conducting the material removed through the cleaning outlet during step (c) to a holding tank, separating the filter aid from the impurities by rapidly circulating the contents of the holding tank through a separator during at least a portion of the time that step (b) is carried out, and storing the separated filter aid in a storage tank for reuse in a subsequent cycle.

* * * * *